United States Patent

[11] 3,615,485

[72] Inventors Rafiqul Islam;
  Sidney G. Garnish, both of London, England
[21] Appl. No. 754,468
[22] Filed Aug. 21, 1968
[45] Patented Oct. 26, 1971
[73] Assignee GAF Corporation
  New York, N.Y.

[54] DIAZO-TYPE DEVELOPERS
  12 Claims, No Drawings
[52] U.S. Cl. ........................................ 96/49, 96/91
[51] Int. Cl. ....................................... G03c 5/34, G03c 1/58
[50] Field of Search .......................... 96/49, 75, 91

[56] References Cited
UNITED STATES PATENTS

| | | | |
|---|---|---|---|
| 2,113,944 | 4/1938 | Leuch | 96/91 X |
| 2,241,104 | 5/1941 | Van der Grinten | 96/49 X |
| 2,431,190 | 11/1947 | Morgan | 96/91 |
| 2,531,004 | 11/1950 | Slifkin | 96/91 X |
| 2,613,149 | 10/1952 | Unkauf | 96/91 |
| 2,657,137 | 10/1953 | Kessels | 96/91 X |
| 2,727,820 | 12/1955 | Botkin | 96/49 |
| 2,743,191 | 4/1956 | Klimkowski et al. | 96/91 X |
| 2,789,904 | 4/1957 | Benbrook et al. | 96/91 X |
| 3,203,803 | 8/1965 | Habib et al. | 96/91 |
| 3,255,007 | 6/1966 | Kosar | 96/91 X |
| 3,303,028 | 2/1967 | Aebi et al. | 96/49 X |
| 3,360,369 | 12/1967 | Amariti et al. | 96/91 X |
| 3,397,985 | 8/1968 | Hendrickx | 96/91 |
| 3,406,072 | 10/1968 | Welch | 96/91 |
| 3,446,620 | 5/1969 | Parker | 96/49 |

OTHER REFERENCES
Dinaburg; M. S., " Photosensitive Diazo Cpds," 1964, p. 126.

*Primary Examiner*—Charles L. Bowers, Jr.
*Attorneys*—Walter G. Hensel, Walter C. Kehm and Samson B. Leavitt ABSTRACT: Developer compositions and their use in the development of 1- or 2-component diazo-type materials, said compositions containing as a solvent medium, formamide, mono- or dialkyl formamides, 2-pyrrolidone, N-substituted derivatives of 2-pyrrolidone, sulfolane, dimethylsulphoxide, ethylene carbonate, gamma-butyrolactone, and other organic compounds containing the structures

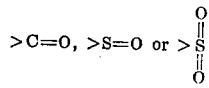

from 0 to about 95 percent of water, and an alkaline reacting developing agent, with or without an azo coupler.

DIAZO-TYPE DEVELOPERS

This invention relates to liquid developers for light-sensitive diazo-type copying material.

Conventional development of diazo-type materials in copying processes can be divided into three categories, known as ammonia development, moist or semidry development, and thermal development.

The diazo-type materials used with ammonia and semidry development processes are known as two-component and one-component materials respectively.

In the ammonia process, a solution containing the diazosensitizer, viz. the diazonium compound, one or more couplers and an organic acid is coated upon a support sheet. The coated sheet is exposed to light in contact with a translucent original. The latent image so obtained is developed by contacting the sheet with ammonia vapor, which neutralizes the acid stabilizer and promotes diazo-type coupling to produce a dye image of the original.

In the moist or semidry process, it is customary for the diazosensitizer to be coated upon a support sheet in conjunction with stabilizer agents. Exposure is carried out as before and the latent image is developed by passing the sheet through an aqueous buffered solution containing one or more couplers or, alternatively, by applying the solution to the surface of the sheet.

Both of these processes have disadvantages. In the ammonia process, it is the ammonia fumes, which require ducting on the machinery used and extra ventilation in the rooms where the process is carried out. The ducting prevents the machinery used from being easily moved and adds considerably to the expense of installation.

Known developer solutions employed in the moist or semidry process have disadvantages which are due to the water contained in them, because these solutions tend to suffer loss of water by evaporation, which can cause crystallization of the developer chemicals and subsequent clogging of the apparatus. Because of this and the tendency for the developer solution to become polluted with dye produced in the reaction, it is conventional operating practice to empty the developer apparatus at the end of each working day and wash the tray and rollers of the applicator system in the apparatus. Also, copies made by this process require drying and tend to curl badly, especially if the developer solution is applied to only one side of the sheet.

The aforementioned disadvantages are overcome by the thermal development process, in which all the components required to form the image are present upon the support sheet and the image obtained by exposure is developed by the application of heat to the sheet. However, this process in its turn suffers from the disadvantages of the effect of the heat on the support sheet and the difficulty of preventing premature coupling at ambient temperatures.

An object of this invention is to overcome or minimize these disadvantages.

The present invention accordingly provides an improved developer for a system where the diazonium compound is coated without couplers, known as a one-component system, or where the diazonium compound is coated together with one or more couplers, known as a two-component system. This developer comprises a developing agent and, as a solvent, at least one liquid or low-melting, water-soluble compound selected from formamide, monoalkyl and dialkyl formamides, 2-pyrrolidone, N-substituted and other derivatives of 2-pyrrolidone, sulfolane dimethyl sulfoxide ethylene carbonate, gamma-butyrolactone and other organic compounds containing the structures

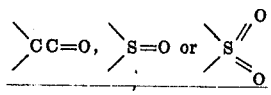

and having a solvent action.

In accordance with one preferred feature of the invention, the solvent comprises at least one compound of the formula:

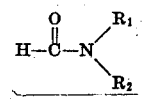

where $R_1$ and $R_2$ are the same or different and each represents a hydrogen atom or an alkyl radical, preferably containing 1 to 4 carbon atoms.

In accordance with a particular embodiment of the invention, the developer is a nonaqueous composition and the solvent component is provided entirely by organic materials of the kinds defined above. Preferably, the solvent is formamide. For two-component material, the developing agent normally comprises a base; for one-component material, it also contains a coupler and an antioxidant.

Formamide, wherein $R_1$ and $R_2$ in the general formula are both hydrogen, is preferred as the solvent in many formulations, but the developers of the invention can include more than one of the compounds mentioned, if required.

Other organic solvents of the present invention, that is to say, the solvent components which can be used apart from amides, are typified by organic substances of a variety of structures which all have at least one double-bonded oxygen atom therein, together with a melting point at most only slightly above room temperature and preferably under 25° C. and also a high dielectric constant; also, it is preferably for the substance to exhibit good solubility for conventional azo couplers, such as resorcinol and phloroglucinol and to have low volatility; desirably having a considerably lower vapor tension than water, and soluble therein.

The formulas of certain of these other organic solvent substances of the invention, which all include the typical double-bonded oxygen atom mentioned above, are as follows:

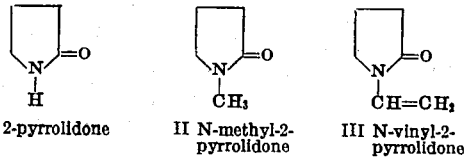

I 2-pyrrolidone    II N-methyl-2-pyrrolidone    III N-vinyl-2-pyrrolidone

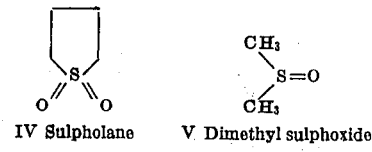

IV Sulpholane    V Dimethyl sulphoxide

VI Ethylene carbonate    VII Gamma-butyrolactone

Some of the properties of these solvents with water for comparison are set out in the following Table:

| Solvent | B.P. (° C.) | M.P. (° C.) | Dielectric constant (° C.) | Solubility of phloroglucinol | Development rate |
|---|---|---|---|---|---|
| Water | 100 | 0 | 80/20 | Good | Poor. |
| I | 245 | 25 | | Fair | Very good. |
| II | 202 | −24 | | Slowly soluble. | Poor. |
| III | [1] 96/11 | 13.5 | | Good | Very good. |
| IV | 285 | 28 | 44/30 | do | Poor. |
| V | 100(d) | 6 | | do | Very good. |
| VI | 243 | 36 | [2] 97.5/20 | do | Slow. |
| VII | 206 | −42 | | Excellent | Moderate. |

[1] Mm. Hg.
[2] Obtained by extrapolation.

In accordance with another particular embodiment of the invention, following the discovery that the water-soluble organic solvent or solvents can be used with advantage in diazo-type development, it has also been discovered that it is only necessary to use small amounts, e.g. of the order of 5 percent by volume and upwards, of the organic solvent or solvents, in order to obtain effective and satisfactory development, the balance of the solvent component being water; the proportion of water can be varied over wide limits, however as illustrated in the examples given below. It has been established that there can be advantages, which may be manifest at various points in the development process or in relation to various aspects of the diazo-type system, in having water in the developer. The invention thus provides both nonaqueous developers and water-containing developers and the choice between these two kinds to be made in any instance is largely governed by the particular advantages which the operator wishes to benefit from.

According to another aspect of the invention, a method of developing one-component and two-component diazo-type material comprises applying to the material a developer of the present invention, as above defined.

The invention, more specifically, includes also a method of making a copy of an original, which comprises exposing a support sheet, which is sensitized by means of a composition including a diazosensitizer, in contact with the original to be copied, to form a latent image on the support sheet, and applying to the exposed side of the support sheet a composition containing a diazo-type developing agent in a solvent selected from formamide and the N-monoalkyl and N,N-dialkyl derivatives with certain organic developer solvents.

A preferred developer formulation of the invention, suitable for one-component material, desirably contains resorcinol, phloroglucinol or a simple derivative thereof as an azo coupler, an antioxidant and either a nitrogen base as discussed above or an alkali metal salt of a carboxylic or other weak acid (or both); suitable salts include sodium benzoate, formate, acetate, propionate, succinate and maleate; nitrogen base carboxylic acids which are suitable include aminopropionic acid (alanine), 4-aminobutyric acid and piperidine-4-carboxylic acid. In general, any conventional azo coupler can be used, the substance used preferably being selected from phenols, phenol derivatives, naphthols, naphthol derivatives, aromatic amines and aliphatic compounds containing at least one activated methylene group. Specific azo couplers, apart from the phenols mentioned, are 4-chlororesorcinol, 2,3-dihydroxy-naphthalene, 2-oxy-3-naphthoic acid ethanolamide, 4,4-methylene-dianiline dihydrochloride and acetoacetbenzylamide.

Other weak acids whose salts can be used include boric acid and di- and triphosphates and, in general, any acid having a K-value lower than $2\times10^{14}$. The purpose of these salts is to provide a buffer action.

A developer of this invention has a faster development time than conventional aqueous developers and gives full development at a lower quantitative rate of application, for example, 5–6 g./m.$^2$ instead of 10–11 g./m.$^2$. Also, the developer can be formulated so as to be more stable than conventional aqueous developers and because the evaporation of the organic solvent(s) used or included is negligible, developers can readily be provided wherein substantially no crystallization of dissolved components takes place, even after extended periods of storage, and no pollution occurs from the dye of the diazo-type material. Where the developer is a nonaqueous composition based upon one or more organic solvents and is applied in controlled limited quantities by any suitable apparatus, a substantially dry print is obtained and, even when only one side of the support sheet is treated, there is no tendency for the sheet to curl.

The invention is further described in the following Examples, in which:

Examples 1–23 and A–D relate to development of one-component material;

Examples 24–25 and E and F relate to development of two-component material;

All the amounts are given in parts by weight.

EXAMPLE 1

| | | |
|---|---|---|
| Formamide | 90 | parts |
| Phloroglucinol | 5 | parts |
| Sodium formate | 5 | parts |
| Thioureadioxide (Imino-amino methane sulfinic acid) | 0.5 | parts |

EXAMPLE 2

| | | |
|---|---|---|
| Formamide | 90 | parts |
| Phloroglucinol | 3 | parts |
| Sodium acetate | 7 | parts |
| Thioureadioxide | 0.3 | parts |

EXAMPLE

| | | |
|---|---|---|
| Formamide | 85 | parts |
| Phloroglucinol | 5 | parts |
| Sodium benzoate | 10 | parts |
| Thioureadioxide | 0.5 | parts |

EXAMPLE

| | | |
|---|---|---|
| Formamide | 80 | parts |
| N-methylformamide | 10 | parts |
| Phloroglucinol | 2.5 | parts |
| Sodium maleate | 5 | parts |
| Thioureadioxide | 0.25 | parts |

EXAMPLE

| | | |
|---|---|---|
| Formamide | 85 | parts |
| N,N-dimethylformamide | 5 | parts |
| Phloroglucinol | 5 | parts |
| Sodium propionate | 5 | parts |
| Thioureadioxide | 0.25 | parts |

EXAMPLE 6

| | | |
|---|---|---|
| Formamide | 90 | parts |
| Resorcinol | 5 | parts |
| 1,2-Dimorpholinoethane | 5 | parts |
| Thioureadioxide | 0.5 | parts |

EXAMPLE

| | | |
|---|---|---|
| Formamide | 99 | parts |
| Resorcinol | 2 | parts |
| β-Hydroxyethylresorcinol | 3 | parts |
| N,N-di-β-hydroxyethylpiperazine | 5 | parts |
| Thioureadioxide | 0.5 | parts |

EXAMPLE 8

| | | |
|---|---|---|
| Formamide | 90 | parts |
| Phloroglucinol | 5 | parts |
| Piperidine-4-carboxylic acid | 5 | parts |

EXAMPLE 9

| | | |
|---|---|---|
| Formamide | 83 | parts |
| Benzaldehyde | 7 | parts |
| Borax | 5 | parts |
| Phloroglucinol | 5 | parts |
| Thioureadioxide | 0.5 | parts |

EXAMPLE 10

| Formamide | 85 | parts |
|---|---|---|
| Furfuraldehyde | 5 | parts |
| Borax | 5 | parts |
| Sodium molybdate | 2 | parts |
| Resorcinol | 2 | parts |
| Phloroglucinol | 2 | parts |
| Thioureadioxide | 0.5 | parts |

EXAMPLE 11

| 2-Pyrrolidone | 95 | parts |
|---|---|---|
| Phloroglucinol | 5 | parts |

EXAMPLE

| N-methyl-2-pyrrolidone | 95 | parts |
|---|---|---|
| Phloroglucinol | 5 | parts |

EXAMPLE 13

| N-vinyl-2-pyrrolidone | 95 | parts |
|---|---|---|
| Phloroglucinol | 3 | parts |

EXAMPLE 14

| Gamma-butyrolactone | 95 | parts |
|---|---|---|
| Phloroglucinol | 3 | parts |
| Diethanolamine | 2 | parts |

EXAMPLE 15

| Dimethyl sulfoxide | 95 | parts |
|---|---|---|
| Phloroglucinol | 3 | parts |

EXAMPLE 16

| Sulfolane | 90 | parts |
|---|---|---|
| Phloroglucinol | 5 | parts |
| Triethanolamine | 5 | parts |

EXAMPLE 17

| Ethylene carbonate | 95 | parts |
|---|---|---|
| Phloroglucinol | .5 | parts |

EXAMPLE 18

| Ethylene carbonate | 45 | parts |
|---|---|---|
| 2-pyrrolidone | 50 | parts |
| Resorcinol | 5 | parts |

EXAMPLE 19

| Dimethyl sulfoxide | 50 | parts |
|---|---|---|
| Gamma-butyro-lactone | 45 | parts |
| Resorcinol | 5 | parts |

EXAMPLE 20

| Dimethyl sulfoxide | 40 | parts |
|---|---|---|
| Gamma-butyro-lactone | 30 | parts |
| Sulfolane | 25 | parts |
| Phloroglucinol | 3 | parts |

EXAMPLE 21

| Formamide | 60 | parts |
|---|---|---|
| 2-pyrrolidone | 35 | parts |
| Sodium benzoate | 5 | parts |
| Thioureadioxide (Imino-amino-methane sulfinic acid) | 0.25 | parts |

EXAMPLE 22

| Formamide | 50 | parts |
|---|---|---|
| Sulfolane | 43 | parts |
| Sodium benzoate | 7 | parts |
| Thioureadioxide | 0.4 | parts |

EXAMPLE 23

| 2-Pyrrolidone | 85 | parts |
|---|---|---|
| Water | 10 | parts |
| Sodium benzoate | 3 | parts |
| Phloroglucinol | 2.5 | parts |

The developers of the above examples develop conventional one-component diazo-type materials at room temperature very rapidly to give a dark image on a white background. Examples 6, 7, 18 and 19 are particularly suitable for developing prints on sensitized tracing paper. Examples 9 and 10 are suitable for developing one-component diazo-type material containing polyvinyl alcohol in the surface coating. The borax and the aldehydes combine with the polyvinyl alcohol to give a dry surface.

Examples of conventional one-component materials are as follows:

EXAMPLE A

A white-base paper is coated with a sensitizing liquid of the following composition:

| 2,5-Dimethoxy-4-para-methylphenyl-thiobenzene diazonium chloro-zincate | 1.5 | parts |
|---|---|---|
| Tartaric or citric acid | 0.5 | parts |
| Water, to make | 100 | parts |

EXAMPLE B

A tracing paper is coated with a sensitizing liquid of the following composition:

| 2,5-Diethoxy-4-para-methylphenyl-thiobenzene diazonium chloro-zincate | 2.5 | parts |
|---|---|---|
| Citric acid | 0.5 | parts |
| Gelatine | 1.5 | parts |
| Water | 70 | parts |
| Ethanol | 25 | parts |
| n-Butanol | 10 | parts |

EXAMPLE C

A tracing paper is coated with a sensitizing liquid of the following composition:

| 2,5-Diethoxy-4-para-methylphenyl-thiobenzene diazonium boro-fluoride | 3 | parts |
|---|---|---|
| Polyvinyl alcohol ("Elvanol" 51–05) ("Elavanol" is a du Pont Trade Mark) | 5 | parts |
| Water | 70–100 | parts |
| Ethanol | 30 | parts |

EXAMPLE D

A tracing paper having a partially hydrolysed cellulose acetate surface is coated with a sensitizing liquid of the following composition:

| 3-chloro-4-dimethylamino-benzine diazonium chloro-zincate | 2.5 | parts |
|---|---|---|
| Water | 70–100 | parts |
| Ethanol | 30 | parts |
| Citric or tartaric acid | 0.5 | parts |

EXAMPLE 24

| Formamide | 80 | parts |
|---|---|---|
| 1,2-Dimorpholinoethane | 20 | parts |

EXAMPLE 25

| Formamide | 80 | parts |
|---|---|---|
| N-methylformamide | 5 | parts |
| N,N'dihydroxyethylpiperazine | 18 | parts |

EXAMPLE 26

| Formamide | 80 | parts |
|---|---|---|
| Triisopropanolamine | 20 | parts |

EXAMPLE 27

| | | |
|---|---|---|
| Formamide | 80 | parts |
| N-methylformamide | 5 | parts |
| 2-Amino-pyridine | 15 | parts |

EXAMPLE 28

| | | |
|---|---|---|
| Formamide | 80 | parts |
| 4-Amino-pyridine | 10 | parts |
| Diisopropanolamine | 10 | parts |

EXAMPLE 29

| | | |
|---|---|---|
| Formamide | 80 | parts |
| Sodium acetate | 10 | parts |
| 2-Amino-pyridine | 10 | parts |

EXAMPLE 30

| | | |
|---|---|---|
| Formamide | 80 | parts |
| 1,2-Dimorpholinoethane | 10 | parts |
| Triisopropanolamine | 10 | parts |

EXAMPLE 31

| | | |
|---|---|---|
| Formamide | 75 | parts |
| N,N-dimethylformamide | 5 | parts |
| 1,2-Dimorpholinoethane | 15 | parts |
| Borax | 5 | parts |

EXAMPLE 32

| | | |
|---|---|---|
| Dimethyl sulfoxide | 85 | parts |
| Diethanolamine | 15 | parts |

EXAMPLE 33

| | | |
|---|---|---|
| Ethylene carbonate | 90 | parts |
| Diethanolamine | 10 | parts |

EXAMPLE 34

| | | |
|---|---|---|
| 2-Pyrrolidone | 80 | parts |
| 1,2-Dimorpholinoethane | 20 | parts |

EXAMPLE 35

| | | |
|---|---|---|
| Sulfolane | 80 | parts |
| 4-Amino-pyridine | 10 | parts |
| Diisopropanolamine | 10 | parts |

The developers of examples 24-35 each develop conventional two-component materials such as are shown in the following examples E and F to give a blue image (example E) or a black image (example F) F) on a white background.

Example E

A white-base paper is coated with, sensitizing liquid of the following composition:

| | | |
|---|---|---|
| Para-diethylamino-benzene diazonium chloro-zincate | 1.9 | parts |
| 2,7-Dihydroxynaphthalene-3,6-disulfonic acid* | 2 | parts |
| Calcium chloride | 10 | parts |
| Citric acid | 1 | parts |
| Water, to make | 100 | parts |

(*Alternatively, the disodium salt can be used).

EXAMPLE F

A white base paper is coated with a sensitizing liquid with the following composition:

| | | |
|---|---|---|
| Paradiethylaminobenzene diazonium chloro-zincate | 2.3 | parts |
| 2,7-Dihydroxynaphthalene-3,6-disulfonic acid* | 2 | parts |
| β-Hydroxyethylresorcinol | 5 | parts |
| Resorcinol | 1 | parts |
| Tartaric acid | 1 | parts |

| | | |
|---|---|---|
| Calcium chloride | 10 | parts |
| Urea | 3 | parts |
| Water, to make | 100 | parts |

(*Alternatively, the disodium salt can be used).

EXAMPLE 36

The following formulation contains an approximately 50 percent aqueous composition:

| | |
|---|---|
| Formamide | 100 ml. |
| Phloroglucinol | 4 g. |
| Sodium benzoate | 10 g. |
| Thiourea dioxide | 0.5 g. |
| Sodium isopropyl naphthalene sulfonate | 0.5 g. |

The foregoing composition was made up and then diluted with an equal volume about 1.05 g.) of water. In use, the developer had the advantage of reducing the somewhat unctuous feel of the copies after developing, which is found with a developer which does not contain water. EXAMPLES 37 to 42

The following formulations, which are identical except for the absence of water (example 37 and the presence of varying amounts of water, were made up.

| | 37 | 38 | 39 | 40 | 41 | 42 |
|---|---|---|---|---|---|---|
| Formamide, ml | 100 | 95 | 75 | 50 | 25 | 5 |
| Water, ml | | 5 | 25 | 50 | 75 | 95 |
| Phloroglucinol, g | 4 | 4 | 4 | 4 | 4 | 4 |
| Sodium benzoate, g | 10 | 10 | 10 | 10 | 10 | 10 |
| Thiourea dioxide, g | 0.5 | 0.5 | 0.5 | 0.5 | 0.5 | 0.5 |
| Aerosol OS, g | 0.5 | 0.5 | 0.5 | 0.5 | 0.5 | 0.5 |

Using a grooved roller applicator device, these solutions were used to develop standard neutral moist papers. All worked adequately. The developer solutions were then allowed to stand open in evaporating dishes for 24 hours. The solutions were again used to develop prints. All were adequate. They were then left open for 72 hours. The solutions of examples 37-41 were essentially unchanged in appearance, although those of examples 40, 41 had lost volume. All, however, developed prints very well. The solution of example 42, which was the most dilute initially, showed considerable crystal formation and loss of volume, but would still develop a print.

It appeared from the results obtained that as little as 5 percent high-boiling, water-miscible solvent in a moist developer, substantially retards crystal formation and allows a moist diazo-type machine to operate for a much longer period, without a cleanup, than would a moist developer containing only water as solvent.

EXAMPLES 43 AND 44

| | 43 | 44 |
|---|---|---|
| Gamma butyrolactone, ml | 50 | 10 |
| Water, ml | 50 | 90 |
| Phloroglucinol, g | 4 | 4 |
| Sodium benzoate, g | 10 | 10 |
| Thiourea dioxide, g | 0.5 | 0.5 |
| Aerosol O.S., g | 0.5 | 0.5 |

The two above solutions also have been found satisfactory.

As will be evident, the invention provides a highly advantageous range of developers for both one-component and two-component diazo-type materials.

What we claim is:

1. A developer composition suitable for use in conjunction with a one-component diazo-type copying material, consisting essentially of, (1) as a diazo-type developing agent, a base; as a solvent for the other ingredients of said composition, compound that controls basicity of the composition (2) at least one compound selected from the group consisting of formamide, N-monoalkyl and dialkyl formamides, 2-pyrrolidone, N-aliphatic substituted 2-pyrrolidones, sulfolane, dimethyl sulfoxide, ethylene carbonate, and α-butyrolactone; (3) at least one azo coupler; and (4) an antioxidant 2. A composition according to claim 1, in which the solvent is a compound of the general formula:

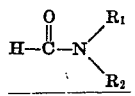

where $R_1$ and $R_2$ are the same or different and each represents a hydrogen atom or an alkyl radical of from one to four carbon atoms.

3. A composition according to claim 2, in which the solvent is formamide.

4. A composition according to claim 20 in which the base is a compound selected from the group consisting of monoethanolamine, diethanolamine, triethanolamine, 1,2-dimorpholinoethane, diisopropanolamine, triisopropanolamine and 2-aminopyridine.

5. A composition according to claim 4 in which the base is present in formamide solution.

6. A composition according to claim 1, in which the azo coupler is selected from the group consisting of phenols, naphthols, aromatic amines and aliphatic compounds containing at least one activate methylene group.

7. A composition according to claim 1, in which the base compound is, an alkali metal salt of a weak acid.

8. A composition according to claim 7, in which the salt is selected from the group consisting of sodium benzoate, formate, acetate, propionate, succinate and maleate.

9. A composition according to claim 7, in which the salt is selected from the group consisting of the alkali metal salts of aminopropionic acid, 4-aminobutyric acid and piperidine-4-carboxylic acid.

10. A method of developing a one-component diazo-type material to produce a positive azo dye image of the original, which comprises applying to the material, after imagewise exposure to light, a composition as defined in claim 20.

11. A method of making positive copy of an original, which comprises exposing a support sheet, which is sensitized by means of a composition including a diazosensitizer, in contact with the original to be copied, to form a latent image on the support sheet, and applying to the exposed side of the support sheet a composition as described in claim 20 wherein the solvent is formamide, N-monoalkyl formamide or N-dialkyl formamide, to obtain a copy of the original.

12. A method according to claim 11, in which the composition containing diazo-type developing agent is applied to the support sheet in an amount of 5–6 g./m.$^2$.